United States Patent
Zeng et al.

(10) Patent No.: US 11,917,230 B2
(45) Date of Patent: Feb. 27, 2024

(54) METHOD AND SYSTEM FOR MAXIMIZING UPLINK BANDWIDTH IN A COMMUNICATION SYSTEM

(71) Applicant: Quanta Cloud Technology Inc., Taipei (TW)

(72) Inventors: Yi-Neng Zeng, Taipei (TW); Keng-Cheng Liu, Taipei (TW); Wei-Ming Huang, Taipei (TW); Shih-Hsun Lai, Taipei (TW); Ji-Jeng Lin, Taipei (TW); Chia-Jui Lee, Taipei (TW); Liao Jin Xiang, Taipei (TW)

(73) Assignee: Quanta Cloud Technology Inc., Taipei (TW)

( * ) Notice: Subject to any disclaimer, the term of this patent is extended or adjusted under 35 U.S.C. 154(b) by 0 days.

(21) Appl. No.: 17/495,629

(22) Filed: Oct. 6, 2021

(65) Prior Publication Data

US 2022/0201555 A1 Jun. 23, 2022

Related U.S. Application Data

(60) Provisional application No. 63/128,603, filed on Dec. 21, 2020.

(51) Int. Cl.
*H04N 21/262* (2011.01)
*H04W 28/20* (2009.01)
(Continued)

(52) U.S. Cl.
CPC ....... *H04N 21/26216* (2013.01); *G06T 9/002* (2013.01); *H04N 21/6181* (2013.01);
(Continued)

(58) Field of Classification Search
CPC ..... H04W 28/20; H04W 28/06; H04W 88/16; G06T 9/002; H04N 21/26216; H04N 21/6181
See application file for complete search history.

(56) References Cited

U.S. PATENT DOCUMENTS 10,797,953 B2 * 10/2020 Banerjee ............ H04L 41/0893
2014/0185801 A1 * 7/2014 Wang ............ H04N 21/440245
380/200
(Continued)

FOREIGN PATENT DOCUMENTS

CN 110688523 A * 1/2020 ............ G06F 16/71
CN 111212109 A * 5/2020 ............ H04L 67/06

*Primary Examiner* — Jefferey F Harold
*Assistant Examiner* — Alexander Boyd
(74) *Attorney, Agent, or Firm* — NIXON PEABODY LLP

(57) ABSTRACT

A system and method for maximizing bandwidth in an uplink for a 5G communication system is disclosed. Multiple end devices generate image streams. A gateway is coupled to the end devices. The gateway includes a gateway monitor agent collecting utilization rate data of the gateway and an image inspector collecting inspection data from the received image streams. An edge server is coupled to the gateway. The edge server includes an edge server monitor agent collecting utilization rate data of the edge server. An analytics manager is coupled to the gateway and the edge server. The analytics manager is configured to determine an allocation strategy based on the collected utilization rate data from the gateway and the edge server.

18 Claims, 9 Drawing Sheets

(51) Int. Cl.
    *H04W 28/06*     (2009.01)
    *H04W 88/16*     (2009.01)
    *H04N 21/61*     (2011.01)
    *G06T 9/00*     (2006.01)

(52) U.S. Cl.
    CPC ............ *H04W 28/06* (2013.01); *H04W 28/20* (2013.01); *H04W 88/16* (2013.01)

(56) References Cited

U.S. PATENT DOCUMENTS

| | | | |
|---|---|---|---|
| 2018/0152517 A1* | 5/2018 | Zhong | H04L 43/04 |
| 2019/0182333 A1* | 6/2019 | Bartfai-Walcott | H04L 67/125 |
| 2019/0319868 A1* | 10/2019 | Svennebring | H04W 24/08 |
| 2021/0360295 A1* | 11/2021 | Sze | H04N 21/234 |
| 2022/0030050 A1* | 1/2022 | Ergen | G06F 9/5011 |
| 2022/0103839 A1* | 3/2022 | Van Rozendaal | H04N 19/463 |
| 2022/0129316 A1* | 4/2022 | Sheoran | G06N 3/08 |
| 2022/0188086 A1* | 6/2022 | Yamato | G06F 8/41 |
| 2022/0188569 A1* | 6/2022 | Ananthanarayanan | G06F 9/5083 |

\* cited by examiner

METHOD AND SYSTEM FOR MAXIMIZING UPLINK BANDWIDTH IN A COMMUNICATION SYSTEM

CROSS REFERENCE TO RELATED APPLICATIONS

This application claims priority from and benefit of U.S. Provisional Patent Application Ser. No. 63/128,603, filed on Dec. 21, 2020, titled "'A Mechanism To Maximize 5G Uplink Bandwidth," which is hereby incorporated by reference herein in its entirety.

TECHNICAL FIELD

The present disclosure relates generally to communication systems. More particularly, aspects of this disclosure relate to a system that efficiently allocates uplink bandwidth to a communications system.

BACKGROUND

Currently used 4G LTE communication systems are being replaced by 5G network systems that allow greater broadband communication. The 5G network standard defined in the Third Generation Partnership Project (3GPP) comprises the characteristics of enhanced Mobile Broadband (eMBB) for high speed, Ultra-Reliable Low Latency Communications (URLLC) for low latency, and massive Machine Type Communications (mMTC) for multiple connections. Currently, a great number of applications are developed based on eMBB characteristics for fast data transmission. However, the bandwidth offered by a 5G network is still limited by the uplink bandwidth. The uplink is the component that is the intermediate component between a 5G device and the network in general.

Image streaming and inferencing (e.g., image inference and processing) are technologies commonly adopted in different industries to fulfill the eMBB standard. In legacy multi-tier architecture, edge servers are built between the cloud and end devices via a 5G router, namely Customer Premise Equipment (CPE), for data transmission. As massive numbers of end devices are connected to the cloud for uploading high image quality streams, requiring a data rate ranging from 20 Mbps to 100 Mbps per device, the limitation of 5G uplink bandwidth can lead to traffic congestion or significant delays. In this legacy architecture, one of the ways to ensure quality of service (QoS) with high image quality is to limit the number of device connections. However, limiting the number of device connections denies service to customers, and is therefore not an ideal solution.

Current uplink devices create a problem of transmission delay and traffic congestion resulting from limited 5G uplink bandwidth, which restricts the number of device connections. The number of device connections impairs 5G service in current communication systems.

Thus, there is a need for a system that facilitates rapid use of existing uplink devices in advanced communications systems. There is also a need for an artificial intelligence model that effectively coordinates edge servers and uplink gateways to maximize processing of image streams. There is also a need for an analytics module that collects received image stream data for determining strategies for coordinating edge servers and uplink gateways.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a communication system having an end device generating an image stream. A gateway is coupled to the end device. The gateway includes a gateway monitor agent collecting utilization rate data of the gateway and an image inspector collecting inspection data from the received image stream. An edge server is coupled to the gateway. The edge server includes an edge server monitor agent collecting utilization rate data of the edge server. An analytics manager is coupled to the gateway and the edge server. The analytics manager is configured to determine an allocation strategy based on the collected utilization rate data from the gateway and the edge server.

A further implementation of the example system is an embodiment where the end device is one of a tablet, a mobile phone, a laptop computer, or a personal computer. Another implementation is where the inspector compresses the image stream through identification of a key frame in the image stream. Another implementation is where the key frame is identified by a region of interest output by an image compression model trained by collected inspection data of previous image streams. Another implementation is where the image compression model is trained by a Convolution Neural Network (CNN) and an Auto-Encoder Network. Another implementation is where the edge server is operable to reconstruct the key frame in the image stream from low resolution to high resolution in real time to lower the uplink bandwidth utilization of the edge server. Another implementation is where the utilization rate data includes a bandwidth utilization rate and a real-time computation rate. Another implementation is where the allocation strategy is selected based on a prediction of utilization rate determined by a utilization model trained by collected utilization data from the edge server and the gateway. Another implementation is where the utilization model includes a Recurrent Neural Network (RNN) and a Long Short Term Memory (LSTM) network. Another implementation is where the gateway includes a task allocator that employs the allocation strategy to assign a task relating to processing the image stream to one of the gateway or the edge server.

Another disclosed example is a method of streamlining image processing in a communication system. The communication system includes a gateway coupled to an edge server. The edge server has an edge server monitor agent and the gateway has a gateway monitor agent and an image inspector. An image stream is received from an end device. Utilization rate data of the gateway is collected via the gateway monitor agent. Inspection data is collected from the received image stream via the image inspector. Utilization rate data of the edge server is collected via the edge server monitor agent. An allocation strategy is determined based on the collected utilization rate data from the gateway and the edge server via an analytics manager coupled to the gateway and the edge server.

Another implementation of the example method is where the end device is one of a tablet, a mobile phone, a laptop computer, or a personal computer. Another implementation is where the inspector compresses the image stream through identification of a key frame in the image stream. Another implementation is where the method includes training an image compression model through collected inspection data of previous image streams. The key frame is identified by a region of interest output by the image compression model. Another implementation is where the image compression model is trained by a Convolution Neural Network (CNN) and an Auto-Encoder Network. Another implementation is where the method includes reconstructing the key frame in the image stream from low resolution to high resolution in real time to lower the uplink bandwidth utilization of the edge server. Another implementation is where the utilization rate data includes a bandwidth utilization rate and a real-time computation rate. Another implementation is where the allocation strategy is selected based on a prediction of utilization rate determined by a utilization model. Another implementation is where the utilization model includes a Recurrent Neural Network (RNN) and a Long Short Term Memory (LSTM) network. Another implementation is where the method includes assigning a task relating to processing the image stream to one of the gateway or the edge server based on the allocation strategy.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

FIG. 5 is an example strategy for allocating tasks in the communication system in

FIG. 1;

Figure 1:
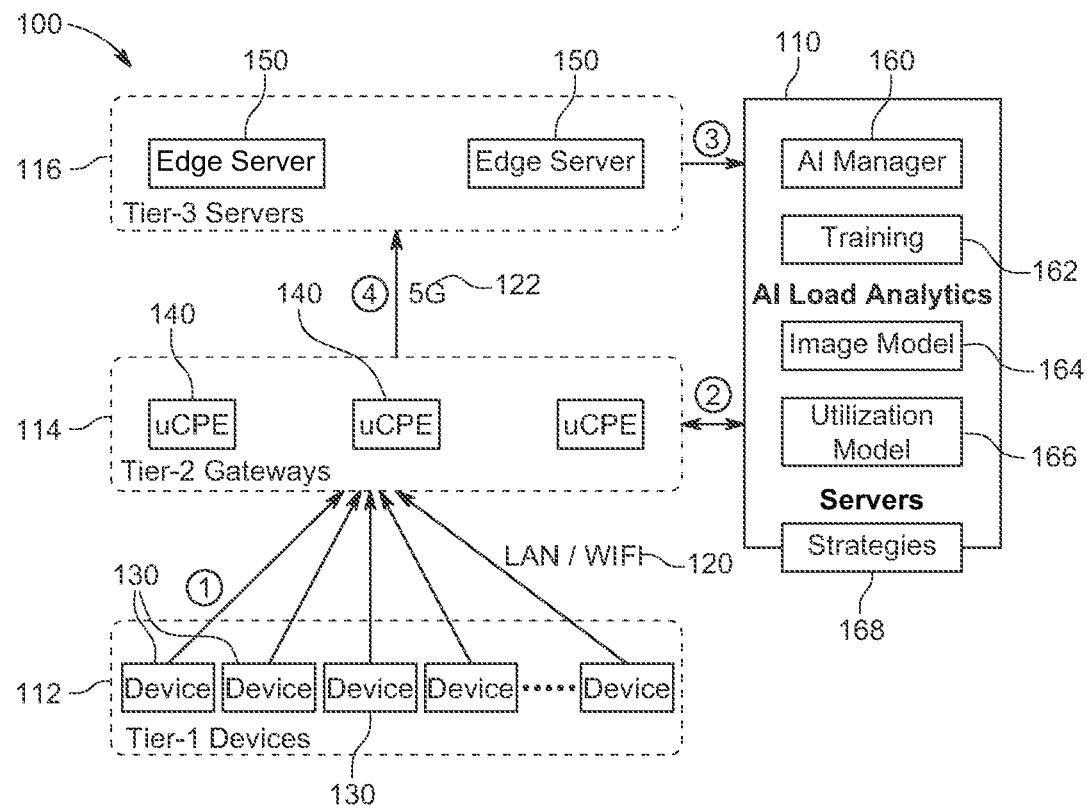
FIG. 1 is a block diagram of the uplink modules for a communication system that facilitates image streaming through analytics.

While the invention is susceptible to various modifications and alternative forms, specific implementations have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

The examples disclosed herein include a multi-tier architecture with artificial intelligence (AI) based load analytics that solves bandwidth bottlenecks at uplinks in a high bandwidth communication system such as a 5G communication system. The architecture replaces standard customer premise equipment (CPE) with Universal Customer Premise Equipment (uCPE). The example uCPE gateway based system is a platform that enables artificial intelligence computing capability and maximizes processing resources and bandwidth utilization through an AI-awareness control system. The uCPE gateway in the example system also functions as a 5G router between the end devices and the edge servers. The example architecture includes components of the uCPE gateway and an AI-awareness control system to implement the balance between image streams compression and dynamic resources.

Specifically, the example uCPE gateway can inspect the image streams generated by the end device to provide compression information and resource utilization rate of the image streams to the AI-awareness control system. Simultaneously, an edge server provides its resource utilization rate, such as computational and bandwidth utilization, to the AI-awareness control system. Hence, the example AI-awareness control system can generate intelligent strategies for balancing the resource allocation between the uCPE gateway and the edge server. The example architecture can effectively compress the image streams and highly decrease the amount of data transmission, so that a limited 5G uplink bandwidth can be fully utilized to maximize processing of image streams from end devices. Therefore, the example uCPE gateway system architecture can resolve the problem of transmission delay and traffic congestion resulted from the limitation of 5G uplink bandwidth and can increase the number of end device connections.

FIG. 1 shows a communication system 100 that includes an example AI load analytics server 110, a tier one device layer 112, a tier two gateway layer 114, and a tier three edge server layer 116. The end devices in the tier one device layer 112 communicate with the gateways in the tier two gateway layer 114 through a local area network (LAN) or wireless communication network 120. The gateways in the tier two gateway layer 114 communicate with the edge servers in the tier three edge server layer 116 through a 5G communication link 122. Both the gateways from the tier two layer 114 and the edge servers in the tier three layer 116 communicate with the AI load analytics server 110.

The tier one layer 112 includes end devices 130 that may be devices having digital image or video capturing capabilities such as mobile phones, tablets, personal computers, or laptop computers. The end devices 130 are capable of generating image streams such as by encoding the captured image or images. The end devices 130 in the tier one layer 112 send the image streams through the LAN or WIFI communication network 120 to a series of uCPE gateways 140 in the tier two layer 114. The uCPE gateways 140 in the tier two layer 114 send computation/bandwidth utilization rate data and image inspection results to the AI load analytics server 110 for further analysis. The components in the uCPE gateways 140 include an AI image inspector, a monitor agent, and a task allocator as will be explained. The AI load analytics server 110 trains an image compression model for image stream compression based on the result of image inspections. The AI load analytics server 110 also trains a utilization model for utilization rate predictions based on utilization rate data sent from the uCPE gateways 140 and the edge servers 150. The trained image compression model is deployed on the uCPE gateways 140 to compress the upcoming image streams from the end devices 130.

Simultaneously, each of a series of edge servers 150 in the tier three layer 116 send its computational/bandwidth utilization rates to the AI load analytics server 110 for further analysis. In this example, the edge servers 150 runs inference tasks, such as determining the presence of a region of interest in an image, or detecting objects based on the region of interest (ROI) in an image. The inference tasks are assigned by task allocator in the uCPE gateways 140. In each edge server 150, a monitor agent collects compute and bandwidth utilization rates when the inference tasks are running. The AI load analytics server 110 trains the utilization model based on the utilization rate data sent from the uCPE gateways 140 and the edge servers 150 to output a resource utilization prediction. The AI server 110 generates the intelligent task strategies (hereinafter termed strategies) based on the resource utilization predictions of the uCPE gateways 140 and the edge servers 150 from the utilization model.

The uCPE gateways 140 implement the strategies from the AI load analytics server 110 to send the compressed image streams received from the end devices 130 to the edge servers 150 for processing. The strategies are adopted for balancing the compressed image streams and the 5G uplink bandwidth between the uCPE gateways 140 and the edge servers 150.

The AI load analytics server 110 includes an AI analytics manager 160, a training module 162, an image compression model 164, a utilization model 166, and a series of allocation balancing strategies 168. The training module 162 includes a Recurrent Neural Network (RNN) and a Long Short Term Memory (LSTM) network for training the utilization model 166. Training the models involves constructing an appropriate dataset. In construction of the dataset, data augmentation is used to increase the diversity of the dataset and the image annotation is adopted for a labeling process. Then, the resulting dataset is loaded, parameters are set, and the network in the model is initialized for preparing for model training. During the model training, the model is iteratively trained until the loss value reaches a predefined desired value. The training module 162 takes historical image compression data to train the image compression model 164. After a sufficiently trained image compression model 164 is established, the training module 162 continues to refine the image compression model 164 with additional compression data. The image compression model 164 models image compression based on the training result of an auto-encoder network. The Auto-encoder network implements an image compression model with the encoding function, decoding function, and distance measurement function. The Auto-encoder network evaluates the information loss between the compression images. The encoding function maps the input image to the latent space (i.e., representation of compressed data). The decoding function adopts this latent space to reconstruct the original input image. In the input image, the reconstruction image retains only the relevant features and removes unnecessary information so as to reduce the size of image data for image compression. The utilization model 166 models the future bandwidth utilization rate and computational rate of each particular uCPE gateway and edge server. In this example, the utilization model 166 is executed every hour based on bandwidth utilization in the last 24 hours. However, other intervals may be used based on other periods of past data collection. The AI load analytics server 110 executes the AI analytics manager 160 to collect utilization data of the edge server 150 and the uCPE gateway 140 for processing image streams and image inspection results. The AI analytics manager 160 acts as an AI-awareness control system for compression of image streams and allocation of processing tasks for the uCPE gateways 140 and the edge servers 150. The AI analytics manager 160 executes the utilization model 166 for predicted utilization rates to determine the allocation balancing strategies 168 for the uCPE gateways 140 and the edge servers 150.

In this example, the strategy θ(t) can be defined as follows:

$$\theta(t)=[(1-G(t))*f_1+(1-C(t))*f_2]*f_3+(1-B(t))*f_4$$

where θ(t) is defined from two factors: the "computing workload" and the "network capacity." The computing workload on the edge server is timely consumed by CPU utilization (C(t)) and GPU utilization (G(t)). The first term, $[(1-G(t))*f_1+(1-C(t))*f_2]*f_3$ determines the computing workload. Network capacity on the edge server refers to timely bandwidth utilization. The second term, (B(t)). (1−B (t))*$f_4$ determines the Network capacity. When θ(t)<0.5, the inference workload is executed at the edge server 150. When θ(t)≥0.5, the inference workload is executed at the uCPE gateway 140.

Figure 2:
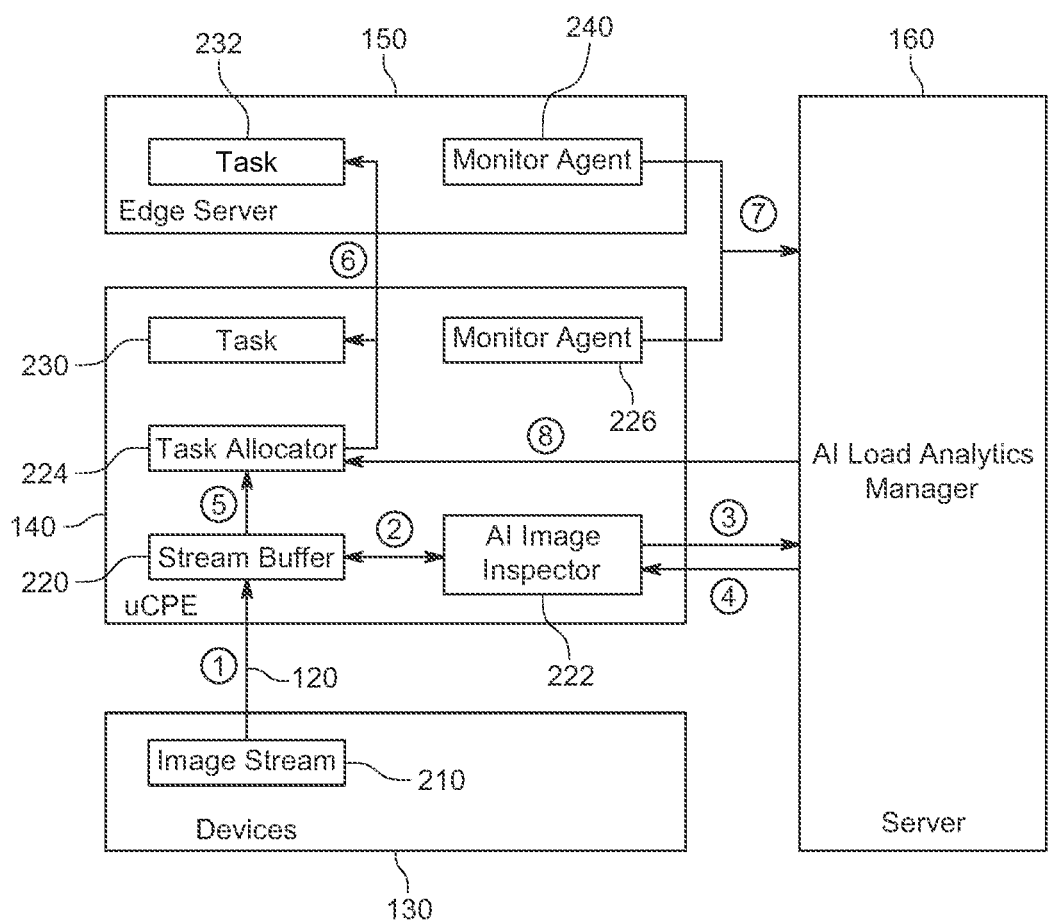
FIG. 2 is a diagram showing the interactive flow of communication data between the components of the communication system in FIG. 1.

FIG. 2 shows an interactive flow of communication data between the end devices 130, uCPE gateways 140, and edge servers 150 in FIG. 1. The utilization data from the uCPE gateways 140 and the edge servers 150 are collected by the AI load analytics manager 160 on the AI load analytics server 110. FIG. 2 thus shows the interactive data and command flow of the multi-tier architecture with the AI load analytics manager 160.

In this example, each of the end devices 130 produce a series of image streams such as an image stream 210. The image stream 210 may be generated by a camera of one of the end devices 130. The end devices 130 may produce any number of image streams that may be sent to the system 100 in FIG. 1. Each of the uCPE gateways 140 include a stream buffer 220, an image inspector 222, a task allocator 224, and a gateway monitor agent 226. The stream buffer 220 functions as a storage device that temporally stores the streams. The image inspector 222 is used to inspect if regions of interests (ROI) are in the image. The task allocator 224 is used to dynamically allocate the compressed steams between the uCPE gateway 140 and edge server 150 according to the strategic analysis. A gateway monitor agent constantly sends the performance data (i.e., compute resource and bandwidth utilization rates on the uCPE and the edge server) to the AI load analytics manager 160. In this example, tasks such as the tasks 230 and 232 are created by the task allocator 224. The tasks 230 and 232 are image stream processing operations that may be performed by either the uCPE gateways 140 or the edge servers 150. As is explained below, the tasks are assigned to the edge server 150 and the uCPE gateway 140 according to the strategy developed by the AI analytics manager 160. The edge server 150 also includes a server monitor agent 240. The end devices 130 send image streams such as the image stream 210 to the uCPE gateways 140 by a standard streaming protocol such as the Real Time Streaming Protocol (RTSP). The end devices 130 send image streams such as the image stream 210 through the communication network 120 to a specific uCPE gateway 140 based on active/passive communication between the end devices 130 and the uCPE gateway 140. The uCPE gateways 140 each receive the image streams from a specific one of the multiple end devices 130 in FIG. 1. The received image streams are temporarily stored in the stream buffer 220 on the respective uCPE gateway 140 and are processed according to strategies determined by the AI analytics manager 160. The images are compressed. The images are processed by either an edge server or the uCPE gateway based on the strategy explained above.

All the image streams from the end devices 130 in the stream buffer 220 are sent to the image inspector 222 for inspecting the streams in the buffer, according to the pre-trained rules and regulations produced by the image compression model. For example, one rule may be directed toward theft detection, where the regions of interests (ROI) are defined as a "human" in the image stream. The image streams are analyzed to detect if there are any "humans" in the images. The image inspector 222 outputs the inspection results in the form of a text file.

The image inspector 222 sends the image inspection results to the AI analytics manager 160 executed by the AI load analytics server 110 for further analysis. As is explained below, the AI analytics manager 160 trains the image compression model 164 in FIG. 1 based on the image inspection results from the image inspector 222 for image compression.

The AI analytics manager 160 sends the trained image compression model 164 to the image inspector 222 for implementing the inference technology on the streams obtained from the stream buffer 220. The image inspector 222 compresses the image streams according to the trained image compression model 164 received from the AI load analytics server 110.

The stream buffer 220 sends the compressed image streams received from the end devices 130 to the task allocator 224. The task allocator 224 allocates the processing of the compressed image streams dynamically between the uCPE gateway 140 and the edge server 150 according to the strategies analyzed from the continuous data output by the uCPE gateway 140 and edge server 150 in relation to the predetermined value θ(t) from the above strategy equation. The continuous utilization data from the uCPE gateway 140 and the edge server 150 is collected from the respective monitor agents 226 and 240. Thus, the monitor agents 226 and 240 in the uCPE gateway 140 and edge server 150 respectively, send the real-time computation/bandwidth utilization rate data to the AI analytics manager 160 executed by the AI load analytics server 110 for analysis and model training. The AI analytics manager 160 trains the utilization model 166 for utilization prediction of the uCPE gateway 140 and the edge server 150; generates the allocation balancing strategies 168 to allocate image stream processing tasks; and sends the generated strategies back to the task allocator 224 on the uCPE gateway 140. The strategy dictates the assignment of tasks relating to image stream processing by the task allocator 224 between the uCPE gateway 140 and the edge server 150.

Figure 3:
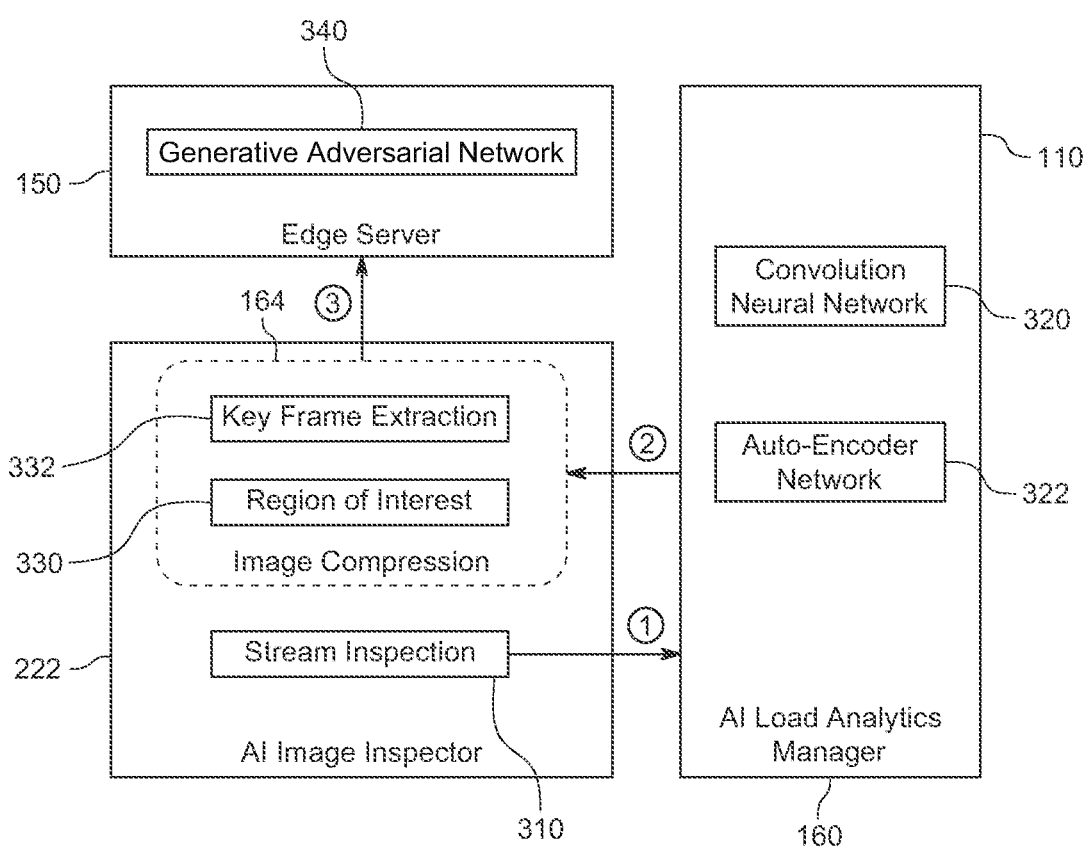
FIG. 3 is a diagram showing the flow of image data from the image inspector to the analytics manager in FIG. 1.

FIG. 3 is a process diagram showing the interaction between the image inspector 222 in FIG. 2 and the edge server 150. In this example, the image inspector 222 is a module executed by the uCPE gateway 140 in FIG. 2. The AI load analytics manager 160, which is executed by the AI load analytics server 110 in FIG. 1, trains the image compression model 164 based on the collection of data shown in FIG. 2. The image streams from the end devices 130 can be compressed through the image inspector 222 in the uCPE gateway 140 using the trained model 164. The compressed image streams can be dynamically allocated between the uCPE gateways 140 and the edge servers 150 for processing according to the strategies generated by the AI analytics manager 160.

The image inspector 222 inspects the image streams (310) based on the pre-trained image compression model 164 and sends the stream inspection results to the AI analytics manager 160. Specifically, the image inspector 222 retains the image for image compression if there is a region of interest in the image and drop the image if it does not contain a region of interest. The AI analytics manager 160 receives the inspection results from the image inspector 222 as the input data for training the image compression model 164. In the training process, the AI analytics manager 160 adopts a Convolution Neural Network (CNN) 320 and an Auto-Encoder Network 322 to extract the features from the stream inspection result and identify the key frames from the streams. The CNN 320 is a deep leaning algorithm used to learn object features based on the input images. In this example, the CNN 320 is adopted to detect simple patterns such as object edges and object features for input images. The Auto-Encoder network 322 is adopted to implement the encoding function, decoding function, and distance measurement function for image compression. Based on the extraction results, the AI analytics manager 160 sends the trained image compression model 164 to the image inspector 222 for performing image stream compression.

After receiving the trained image compression model 164, the image inspector 222 implements the inference technology and adaptively compresses frames on subsequent image streams. The image inspector 222 locates a region of interest (ROI) (330) in the frames of an image stream using the trained image compression model 164. The located regions of interest are used to compress the frames by extracting key frames from the image stream that have the ROIs and dropping the images without ROI (332). The image inspector 222 sends the Region of Interest information and key frame data to the edge server 150. The trained image compression model 164 may also be accessed by the edge server 150 to adopt a Generative Adversarial Network (GAN) 340 to reanimate subsequent image streams based on the location of Regions of Interest and key frames from the uCPE gateway 140. The image compression model 164 accessed by the edge server 150 also may adopt AI-based super-resolution technology to reconstruct key frames in the image streams from low resolution to high resolution in real time, in order to lower the uplink bandwidth utilization.

Figure 4:
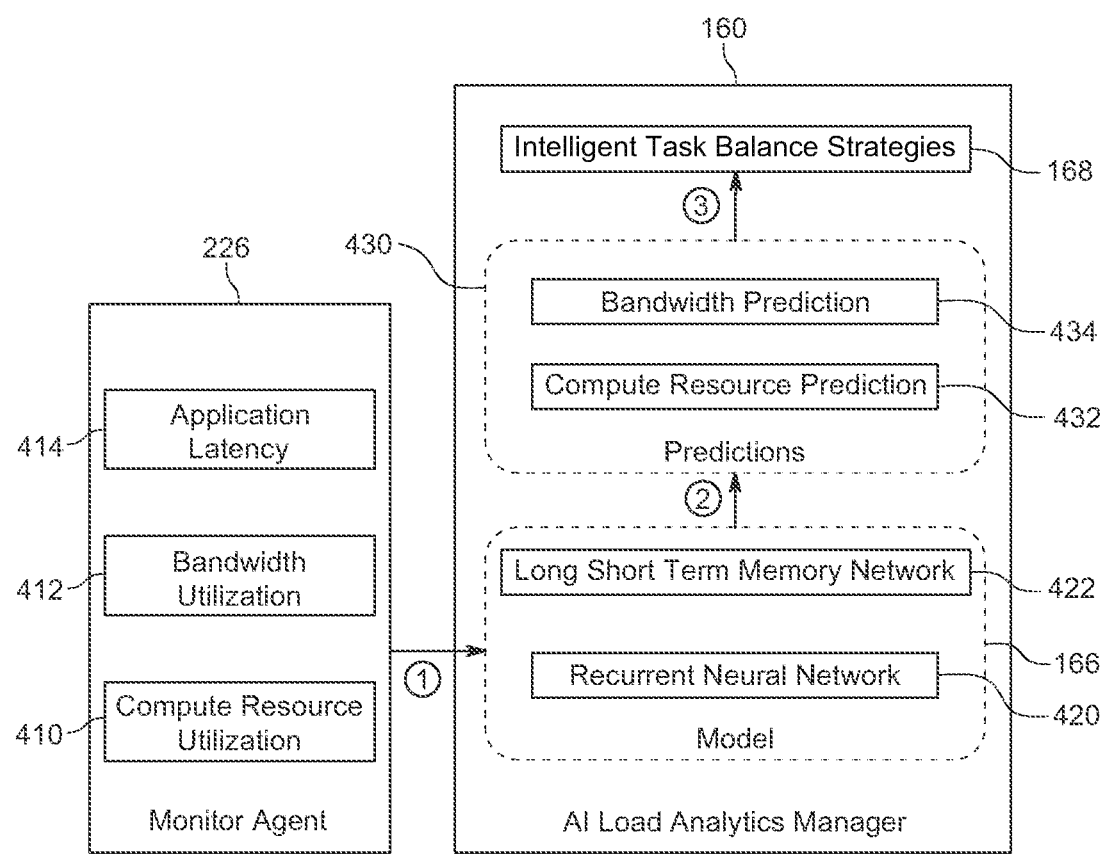
FIG. 4 is a diagram of the interactive flow of utilization prediction and strategies generation between the monitor agent and the analytics manager in FIG. 1.

FIG. 4 shows the interactive flow of utilization prediction from the utilization model 166 and the generation of allocation balancing strategies 168 executed by the AI analytics manager 160 based on utilization data collected by the gateway monitor agent 226. The gateway monitor agent 226 constantly sends performance data in relation to the uCPE gateway 140 to the AI analytics manager 160. Similar data is sent from the server monitor agent 240 of the edge server 150. The performance data includes computational resource utilization 410, bandwidth utilization 412, and application latency 414 for the respective uCPE gateway 140 and edge server 150. Both CPU and GPU utilization is collected to measure the utilization of compute resources. The maximum rate in terms of data transmission across a wire or wireless network is regarded as bandwidth. The consumed bandwidth in bit/s indicates Internet utilization.

The AI analytics manager 160 receives the data from the monitor agents such as the gateway monitor agent 226 and trains the utilization model 166 by adopting a Recurrent Neural Network (RNN) 420 and a Long Short Term Memory (LSTM) network 422 to obtain a time-series prediction 430 for resource utilization. The time-series prediction 430 includes a computing resources prediction 432 and a bandwidth prediction 434. The AI analytics manager 160 implements the inference technology to the utilization data constantly received from the gateway monitor agent 226 using the trained utilization model 166 to generate the allocation balancing strategies 168 according to the predictions 430. In this example, the utilization model makes predictions once an hour for an hour in the future. In this example, utilization data from two weeks is collected for training a utilization model 166. Based on the trained model, the utilization data from the past 24 hours can be used to predict the next one-hour network bandwidth. The allocation balancing strategies 168 are then sent to the uCPE gateway 140 to determine allocation of processing tasks.

Figure 5:
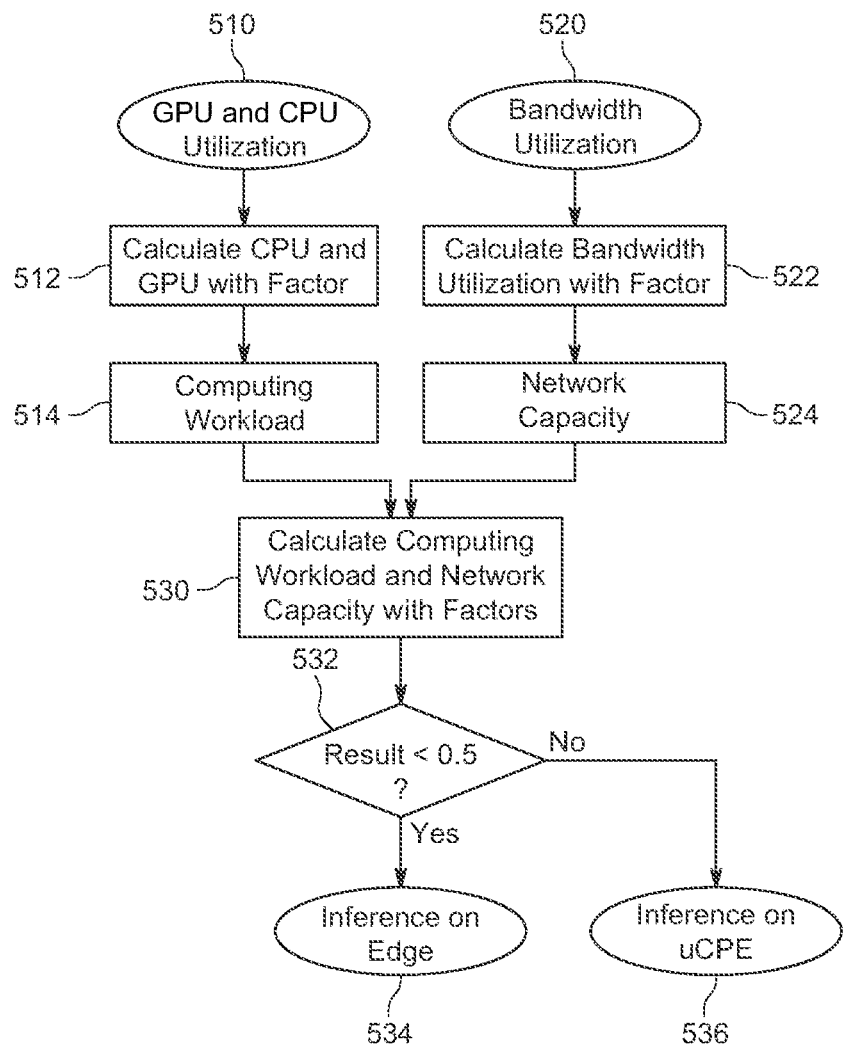

FIG. 5 shows an example strategy for allocating tasks in the communication system in FIG. 1. Both GPU and CPU utilization rates are collected from the edge servers 150 and the uCPE gateways 140 (510). The collected data is then used to calculate the overall CPU and GPU utilization rate with its respective weighting (512). The calculated utilization rate is used to obtain the computing workload value (514). Similarly, data is collected relation to bandwidth utilization (520). The bandwidth utilization is calculated from the collected data with its weighting (522). The determined bandwidth utilization is used to determine network capacity (524). The obtained computing workload and network capacity are calculated with their respective weighting (530). The computing workload and network capacity are scaled to a factor between 1 and 0. The scaled factor is compared to determine whether it is above or below 0.5 (532). If the result is less than 0.5, the inference tasks are executed by the edge server 150 (534). If the result is greater than 0.5, the inference tasks are executed by the uCPE gateway 140 (536).

Figure 6:
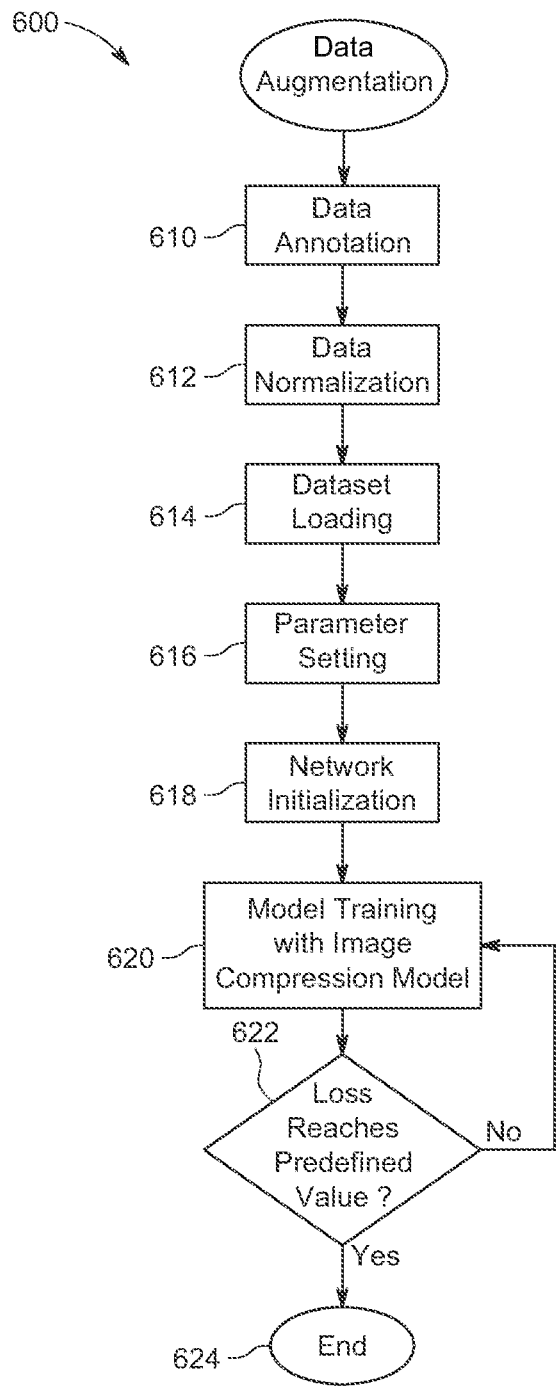
FIG. 6 is a flow diagram of the process of training the image compression model in the communication system in FIG. 1.
Figure 7:
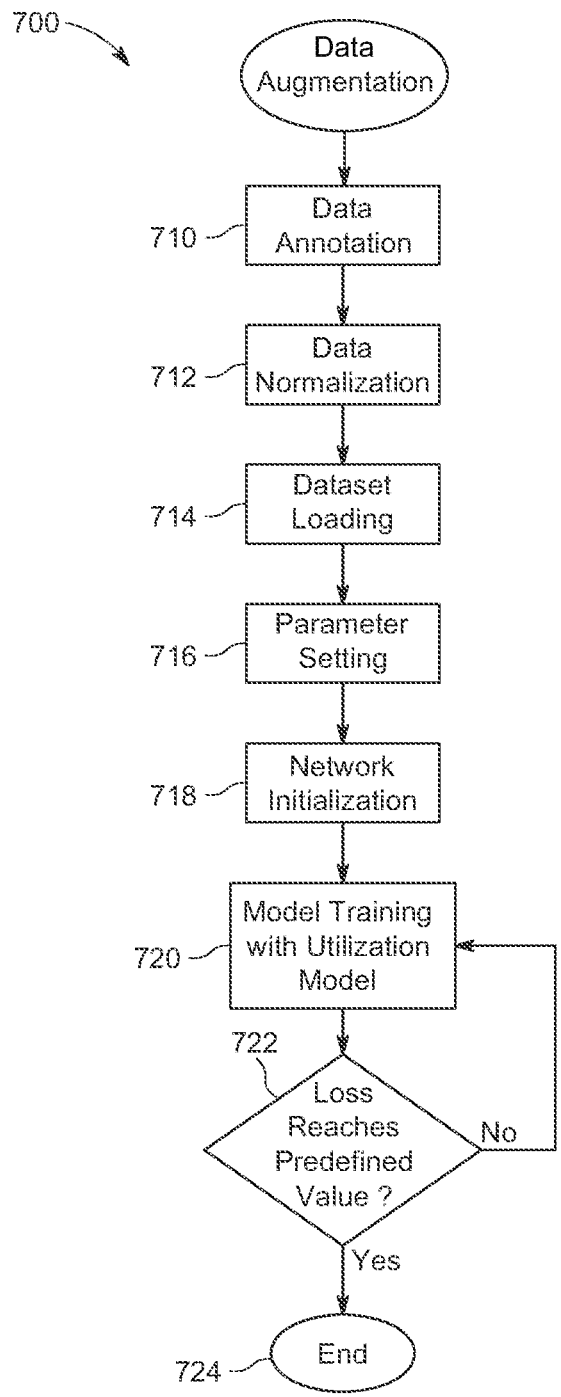
FIG. 7 is a flow diagram of the process of training the utilization model in the communication system in FIG. 1.

FIG. 6 is a flow diagram of an image compression model training routine 600 of the example AI analytics manager 160 in FIG. 1. FIG. 7 is a flow diagram of a utilization model training routine 700 of the example AI analytics manager 160 in FIG. 1. The flow diagrams in FIGS. 6-7 are representative of example machine readable instructions for the process of producing a strategy to optimize bandwidth from image streams in an edge server and training models used by the strategy. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 6-7, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine 600 for compression model training in FIG. 6 first performs data annotation (610). The image data is obtained by using an open-source dataset such as Common Objects in Context (COCO). The COCO consists of 330K images with 80 object categories, which is used to implement training for large-scale objection detection. The bounding box of an object is annotated with a coordinate using JSON format: (x-top left, y-top left, width, height). The data is then normalized for fitting in the image compression model (612). The dataset is then loaded into the model (614). The parameters are then set for the image compression model (616). The parameter settings are implemented for objectives such as improving the accuracy of object detection and prediction of the CPU/GPU utilization. The parameters include, for example, batch size (the number of images used for training in one cycle), loss function (an indicator used to evaluate the performance of model training), and epochs (one cycle through the full training dataset).

The Convolution Neural Network (CNN) 320 and an Auto-Encoder Network 322 are initialized (618). The image compression model is then trained with the training set data and resulting outputs from the model are compared with the actual outputs (620). The loss between the actual and model is compared to determine if the loss reaches a predefined value (622). If the loss reaches a predefined value, the current compression model is deemed sufficiently accurate and the routine ends (624). If the loss does not reach the predefined value, the weights are adjusted, and the compression model is retrained (620).

The routine 700 for utilization model training in FIG. 7 first performs data annotation (710). Based on the two parameters (i.e., time and network bandwidth), the collected data is pre-processed into time-series data. The amount of data used for model training and prediction is annotated. For example, based on the trained model, the utilization data from the past 24 hours for network bandwidth can be used to predict the network bandwidth over the next hour. To annotate data in this example, network bandwidth data is collected from the last 25 hours. The data is further divided into 24 hour and 1 hour data. The 24 hour data for network bandwidth is used to predict the next 1 hour data for network bandwidth adopted for model training.

The data is then normalized for fitting in the utilization model (712). The dataset is then loaded into the utilization model (714). The parameters are then set for the utilization model similar to the process in FIG. 6 (716). The Recurrent Neural Network (RNN) 420 and a Long Short Term Memory (LSTM) network 422 are initialized (718). The utilization model is then trained with the training set data and resulting outputs from the model are compared with the actual outputs (720). The loss between the actual and model is compared to determine if the loss reaches a predefined value (722). If the loss reaches a predefined value, the current utilization model is deemed sufficiently accurate and the routine ends (724). If the loss does not reach the predefined value, the weights are adjusted, and the utilization model is retrained (720).

Figure 8:
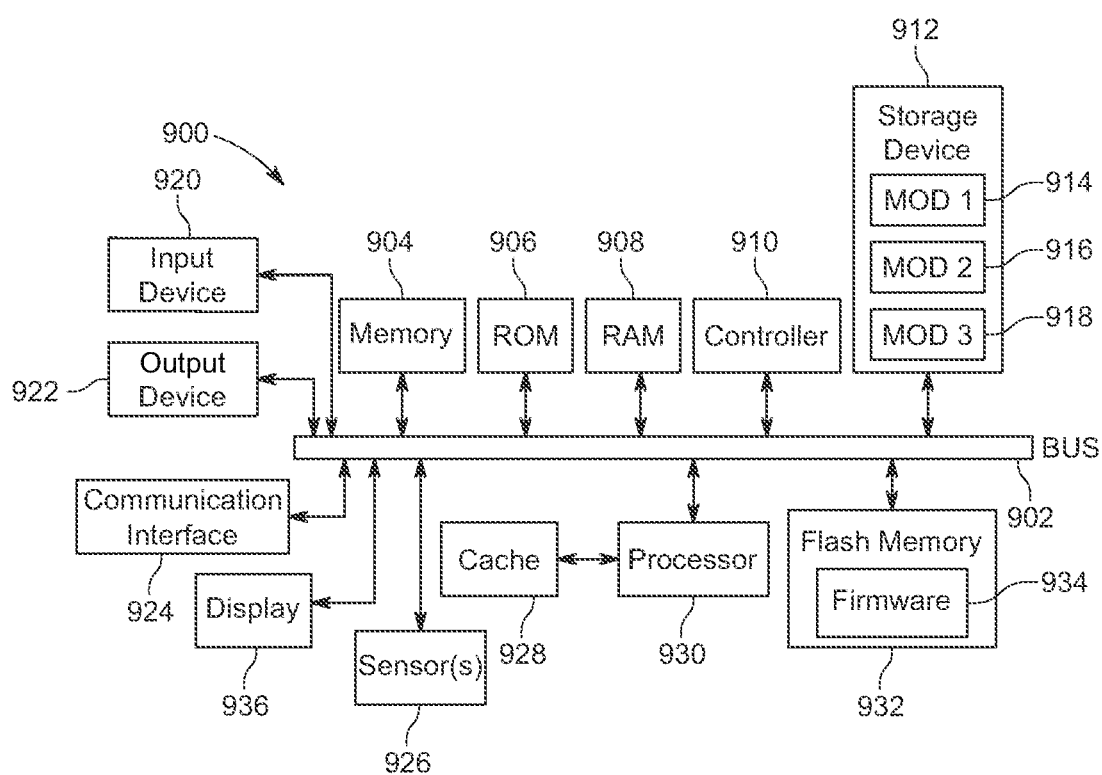
FIGS. 8-9 are block diagrams of computer systems to implement the processes described herein.

FIG. 8 illustrates an example computing system 900, in which the components of the computing system are in electrical communication with each other using a system bus 902. The system 900 includes a processing unit (CPU or processor) 930; and the system bus 902 that couples various system components, including the system memory 904 (e.g., read only memory (ROM) 906 and random access memory (RAM) 908), to the processor 930. The system 900 can include a cache 928 of high-speed memory connected directly with, in close proximity to, or integrated as part of the processor 930. The system 900 can copy data from the memory 904 and/or the storage device 912 to the cache 928 for quick access by the processor 930. In this way, the cache can provide a performance boost for processor 930 while waiting for data. These and other modules can control or be configured to control the processor 930 to perform various actions. Other system memory 904 may be available for use as well. The memory 904 can include multiple different types of memory with different performance characteristics.

The processor 930 can include any general purpose processor and a hardware module or software module, such as module 1 914, module 2 916, and module 3 918 embedded in storage device 912. The hardware module or software module is configured to control the processor 930, as well as a special-purpose processor where software instructions are incorporated into the actual processor design. The processor 930 may essentially be a completely self-contained computing system that contains multiple cores or processors, a bus, memory controller, cache, etc. A multi-core processor may be symmetric or asymmetric.

To enable user interaction with the computing device 900, an input device 920 is provided as an input mechanism. The input device 920 can comprise a microphone for speech, a touch-sensitive screen for gesture or graphical input, keyboard, mouse, motion input, and so forth. In some instances, multimodal systems can enable a user to provide multiple types of input to communicate with the system 900. In this example, an output device 922 is also provided. A communications interface 924 can govern and manage the user input and system output.

Storage device 912 can be a non-volatile memory to store data that is accessible by a computer. The storage device 912 can be magnetic cassettes, flash memory cards, solid state memory devices, digital versatile disks, cartridges, random access memories (RAMS) 908, read only memory (ROM) 906, and hybrids thereof.

The controller 910 can be a specialized microcontroller or processor on the system 900, such as a BMC (baseboard management controller). In some cases, the controller 910 can be part of an Intelligent Platform Management Interface (IPMI). Moreover, in some cases, the controller 910 can be embedded on a motherboard or main circuit board of the system 900. The controller 910 can manage the interface between system management software and platform hardware. The controller 910 can also communicate with various system devices and components (internal and/or external), such as controllers or peripheral components, as further described below.

The controller 910 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 910 to initiate or conduct specific hardware recovery procedures or operations, as further described below.

The controller 910 can also include a system event log controller and/or storage for managing and maintaining events, alerts, and notifications received by the controller 910. For example, the controller 910 or a system event log controller can receive alerts or notifications from one or more devices and components, and maintain the alerts or notifications in a system event log storage component.

Flash memory 932 can be an electronic non-volatile computer storage medium or chip that can be used by the system 900 for storage and/or data transfer. The flash memory 932 can be electrically erased and/or reprogrammed. Flash memory 932 can include EPROM (erasable programmable read-only memory), EEPROM (electrically erasable programmable read-only memory), ROM, NVRAM, or CMOS (complementary metal-oxide semiconductor), for example. The flash memory 932 can store the firmware 934 executed by the system 900 when the system 900 is first powered on, along with a set of configurations specified for the firmware 934. The flash memory 932 can also store configurations used by the firmware 934.

The firmware 934 can include a Basic Input/Output System or equivalents, such as an EFI (Extensible Firmware Interface) or UEFI (Unified Extensible Firmware Interface). The firmware 934 can be loaded and executed as a sequence program each time the system 900 is started. The firmware 934 can recognize, initialize, and test hardware present in the system 900 based on the set of configurations. The firmware 934 can perform a self-test, such as a POST (Power-On-Self-Test), on the system 900. This self-test can test the functionality of various hardware components such as hard disk drives, optical reading devices, cooling devices, memory modules, expansion cards, and the like. The firmware 934 can address and allocate an area in the memory 904, ROM 906, RAM 908, and/or storage device 912, to store an operating system (OS). The firmware 934 can load a boot loader and/or OS, and give control of the system 900 to the OS.

The firmware 934 of the system 900 can include a firmware configuration that defines how the firmware 934 controls various hardware components in the system 900. The firmware configuration can determine the order in which the various hardware components in the system 900 are started. The firmware 934 can provide an interface, such as an UEFI, that allows a variety of different parameters to be set, which can be different from parameters in a firmware default configuration. For example, a user (e.g., an administrator) can use the firmware 934 to specify clock and bus speeds; define what peripherals are attached to the system 900; set monitoring of health (e.g., fan speeds and CPU temperature limits); and/or provide a variety of other parameters that affect overall performance and power usage of the system 900. While firmware 934 is illustrated as being stored in the flash memory 932, one of ordinary skill in the art will readily recognize that the firmware 934 can be stored in other memory components, such as memory 904 or ROM 906.

System 900 can include one or more sensors 926. The one or more sensors 926 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 926 can communicate with the processor, cache 928, flash memory 932, communications interface 924, memory 904, ROM 906, RAM 908, controller 910, and storage device 912, via the bus 902, for example. The one or more sensors 926 can also communicate with other components in the system via one or more different means, such as inter-integrated circuit (I2C), general purpose output (GPO), and the like. Different types of sensors (e.g., sensors 926) on the system 900 can also report to the controller 910 on parameters, such as cooling fan speeds, power status, operating system (OS) status, hardware status, and so forth. A display 936 may be used by the system 900 to provide graphics related to the applications that are executed by the controller 910.

Figure 9:
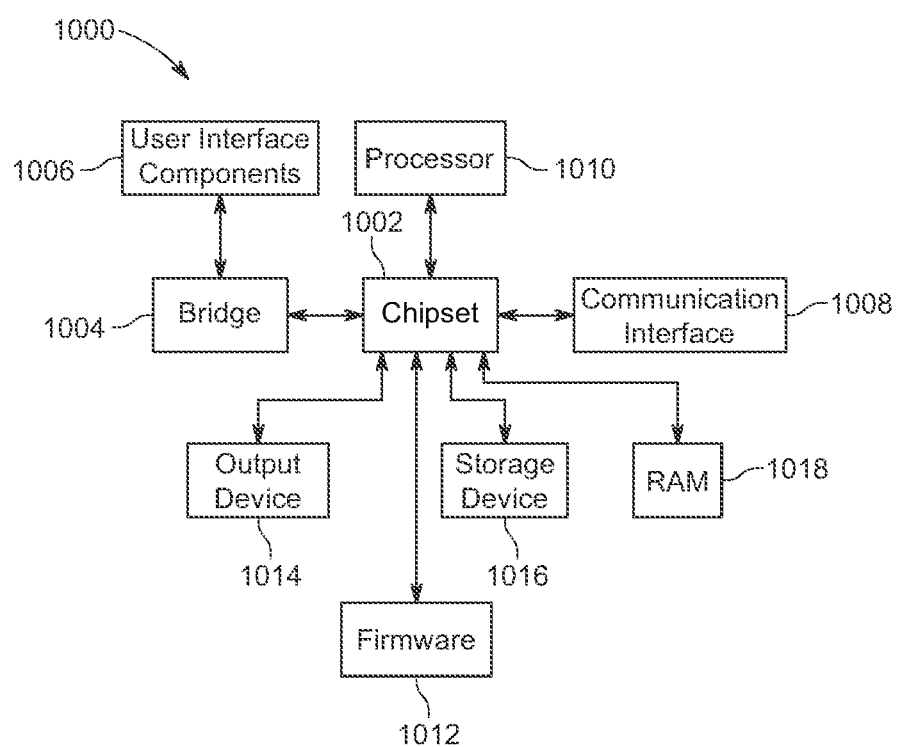

FIG. 9 illustrates an example computer system 1000 having a chipset architecture that can be used in executing the described method(s) or operations, and generating and displaying a graphical user interface (GUI). Computer system 1000 can include computer hardware, software, and firmware that can be used to implement the disclosed technology. System 1000 can include a processor 1010, representative of a variety of physically and/or logically distinct resources capable of executing software, firmware, and hardware configured to perform identified computations. Processor 1010 can communicate with a chipset 1002 that can control input to and output from processor 1010. In this example, chipset 1002 outputs information to output device 1014, such as a display, and can read and write information to storage device 1016. The storage device 1016 can include magnetic media, and solid state media, for example. Chipset 1002 can also read data from and write data to RAM 1018. A bridge 1004 for interfacing with a variety of user interface components 1006, can be provided for interfacing with chipset 1002. User interface components 1006 can include a keyboard, a microphone, touch detection and processing circuitry, and a pointing device, such as a mouse.

Chipset 1002 can also interface with one or more communication interfaces 1008 that can have different physical interfaces. Such communication interfaces can include interfaces for wired and wireless local area networks, for broadband wireless networks, and for personal area networks. Further, the machine can receive inputs from a user via user interface components 1006, and execute appropriate functions, such as browsing functions by interpreting these inputs using processor 1010.

Moreover, chipset 1002 can also communicate with firmware 1012, which can be executed by the computer system 1000 when powering on. The firmware 1012 can recognize, initialize, and test hardware present in the computer system 1000 based on a set of firmware configurations. The firmware 1012 can perform a self-test, such as a POST, on the system 1000. The self-test can test the functionality of the various hardware components 1002-1018. The firmware 1012 can address and allocate an area in the memory 1018 to store an OS. The firmware 1012 can load a boot loader and/or OS, and give control of the system 1000 to the OS. In some cases, the firmware 1012 can communicate with the hardware components 1002-1010 and 1014-1018. Here, the firmware 1012 can communicate with the hardware components 1002-1010 and 1014-1018 through the chipset 1002, and/or through one or more other components. In some cases, the firmware 1012 can communicate directly with the hardware components 1002-1010 and 1014-1018.

It can be appreciated that example systems 900 (in FIG. 8) and 1000 (in FIG. 9) can have more than one processor (e.g., 930, 1010), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The foregoing description of the embodiments, including illustrated embodiments, has been presented only for the purpose of illustration and description and is not intended to be exhaustive or limiting to the precise forms disclosed.

Numerous modifications, adaptations, and uses thereof will be apparent to those skilled in the art.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A communication system comprising:
   an end device generating an image stream;
   a gateway coupled to the end device, the gateway including a gateway monitor agent collecting utilization rate data of the gateway, a task allocator, and an image inspector collecting inspection data from the received image stream;
   an edge server coupled to the gateway via an uplink, the edge server including an edge server monitor agent collecting utilization rate data of the edge server, wherein the edge server and the gateway are each capable of performing an identical image inference task relating to processing the image stream; and
   an analytics manager coupled to the gateway and the edge server, the analytics manager configured to determine an allocation strategy of the image inference task relating to processing the image stream to be performed by either the gateway or the edge server to maximize uplink bandwidth utilization from the gateway to the edge server, wherein the allocation strategy is selected based on a prediction of utilization rate determined by a utilization model trained by the collected utilization rate data from the gateway and the edge server, and wherein the task allocator employs the allocation strategy to assign the image inference task relating to processing the image stream to one of the gateway or the edge server.

2. The system of claim 1, wherein the end device is one of a tablet, a mobile phone, a laptop computer, or a personal computer.

3. The system of claim 1, wherein the image inspector compresses the image stream through identification of a key frame in the image stream.

4. The system of claim 3, wherein the key frame is identified by a region of interest output by an image compression model trained by collected inspection data of previous image streams, and wherein images with key frames are extracted from the image stream and images without the region of interest are dropped.

5. The system of claim 4, wherein the image inference task is determining the presence of a region of interest in an image of the image stream.

6. The system of claim 4, wherein the image compression model is trained by a Convolution Neural Network (CNN) and an Auto-Encoder Network.

7. The system of claim 3, wherein the edge server is operable to reconstruct the key frame in the image stream from low resolution to high resolution in real time to lower the uplink bandwidth utilization of the edge server.

8. The system of claim 1, wherein the utilization rate data includes a bandwidth utilization rate and a real-time computation rate.

9. The system of claim 1, wherein the utilization model includes a Recurrent Neural Network (RNN) and a Long Short Term Memory (LSTM) network that obtain a time-series prediction for bandwidth prediction.

10. The system of claim 1, wherein the allocation strategy allocates the inference task to the edge server based on whether a computing workload value of the edge server and a timely bandwidth utilization value of the edge server are less than a threshold value.

11. A method of streamlining image processing in a communication system including a gateway coupled to an edge server having an edge server monitor agent, the gateway having a gateway monitor agent and an image inspector, wherein the edge server and the gateway are each capable of performing an identical image inference task relating to processing the image stream, the method comprising:
   receiving an image stream from an end device;
   collecting utilization rate data of the gateway via the gateway monitor agent;
   collecting inspection data from the received image stream via the image inspector;
   collecting utilization rate data of the edge server via the edge server monitor agent;
   selecting an allocation strategy of the image inference task relating to processing the image stream to be performed by either the gateway or the edge server to maximize uplink bandwidth utilization from the gateway to the edge server, wherein the allocation strategy is selected based on a prediction of utilization rate determined by a utilization model trained by the collected utilization rate data from the gateway and the edge server via an analytics manager coupled to the gateway and the edge server; and
   assigning the image inference task relating to processing the image stream to one of the gateway or the edge server based on the allocation strategy.

12. The method of claim 11, wherein the end device is one of a tablet, a mobile phone, a laptop computer, or a personal computer.

13. The method of claim 11, wherein the image inspector compresses the image stream through identification of a key frame in the image stream.

14. The method of claim 13, further comprising training an image compression model through collected inspection data of previous image streams, wherein the key frame is identified by a region of interest output by the image compression model and wherein key frames are extracted from the image stream and images without the region of interest are dropped.

15. The method of claim 14, wherein the image compression model is trained by a Convolution Neural Network (CNN) and an Auto-Encoder Network.

16. The method of claim 13, further comprising reconstructing the key frame in the image stream from low resolution to high resolution in real time to lower the uplink bandwidth utilization of the edge server.

17. The method of claim 11, wherein the utilization rate data includes a bandwidth utilization rate and a real-time computation rate.

18. The method of claim 11, wherein the utilization model includes a Recurrent Neural Network (RNN) and a Long Short Term Memory (LSTM) network that obtain a time-series prediction for bandwidth prediction.

* * * * *